March 24, 1953  K. T. KELLER  2,632,668
LIMOUSINE PARTITION
Filed Oct. 13, 1948  2 SHEETS—SHEET 1
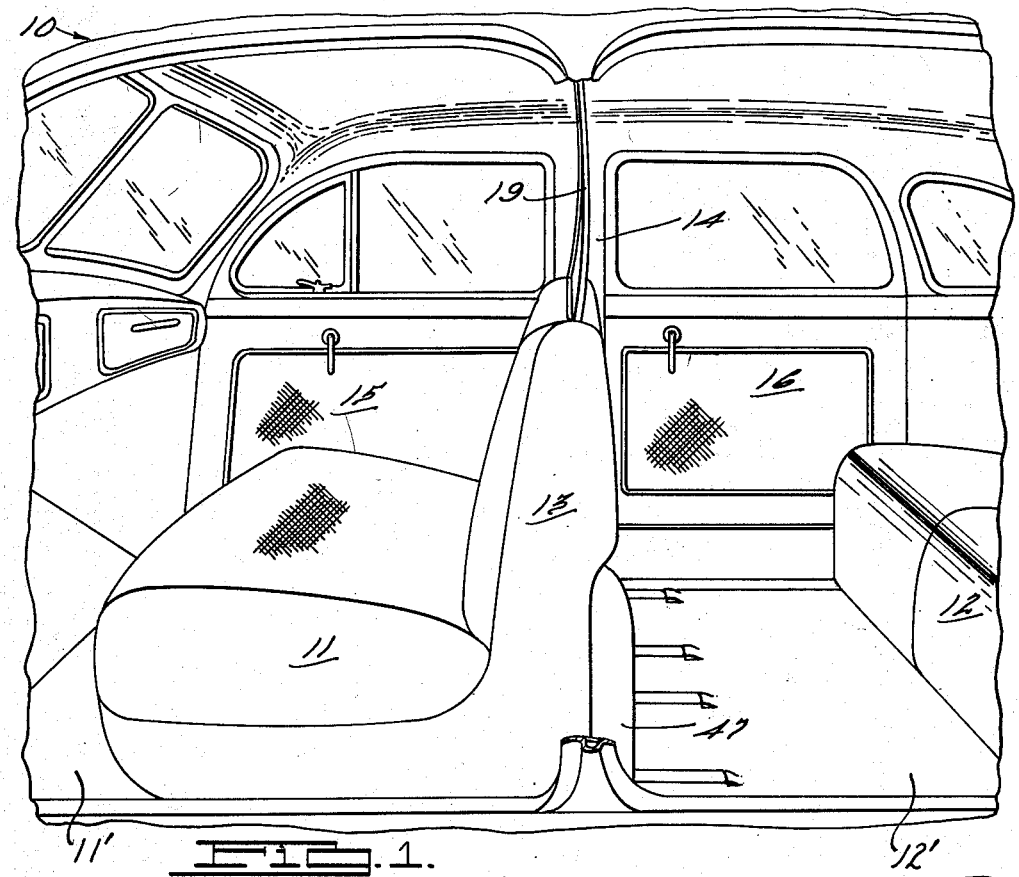
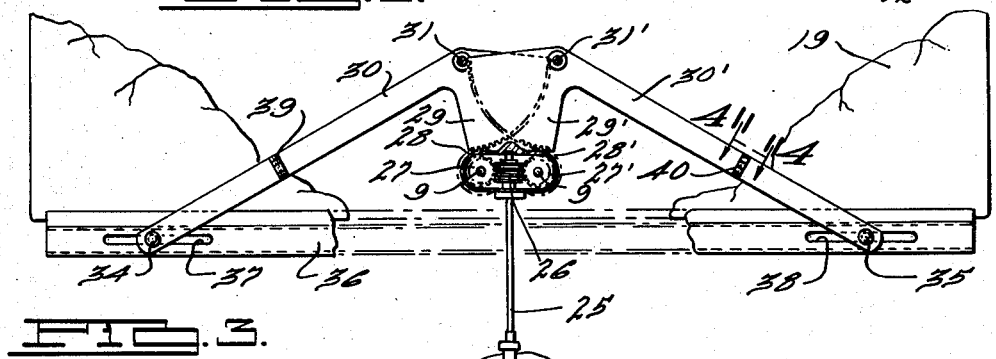
INVENTOR.
Kaufman T. Keller.
BY
Harness and Harris
ATTORNEYS.

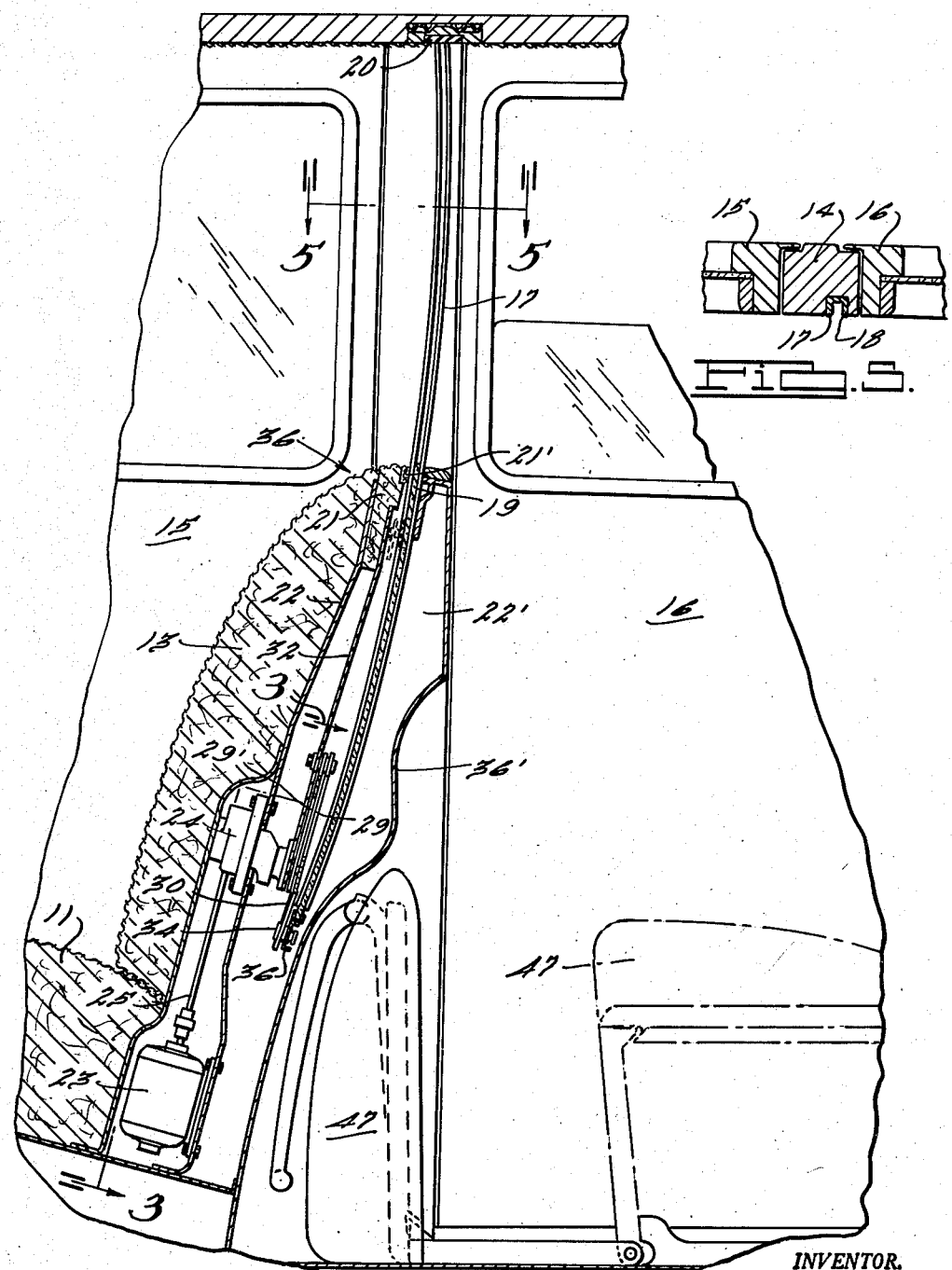

Patented Mar. 24, 1953

2,632,668

UNITED STATES PATENT OFFICE 2,632,668

LIMOUSINE PARTITION

Kaufman T. Keller, Detroit, Mich., assignor to Chrysler Corporation, Highland Park, Mich., a corporation of Delaware Application October 13, 1948, Serial No. 54,273

1 Claim. (Cl. 296—85)

This invention relates to an improved vehicle body partition. More particularly, the invention pertains to an extensible and retractable partition of this character for dividing the front and rear seat compartments of a vehicle so that the latter may be converted to and from limousine style compartment.

One of the main objects of the invention is to provide a vehicle with a partition of this type which is curvilinear in contour and is adapted to be retracted completely within the confines of the back rest of a seat of the vehicle.

Another object of my invention is to provide a transparent partition of the type that is supported in recessed tracks and is completely devoid of any type of frame, thereby allowing unobstructed vision to the passengers of the vehicle.

A further object of my invention is to provide a limousine type of motor vehicle with an improved partition between the passenger's compartment and the driver's compartment which allows an increased amount of foot room for the passengers of the vehicle.

Other objects and advantages will become more apparent from the following description of one embodiment of my invention, reference being had to the accompanying drawings in which:

Fig. 1 is a side elevational view of the interior of a motor vehicle of the closed car type embodying my invention.

Fig. 2 is an enlarged longitudinal vertical sectional view of the intermediate portion of the vehicle shown in Fig. 1, illustrating my improved partition and its supporting and operating mechanism.

Fig. 3 is a transverse sectional view taken on the line 3—3 of Fig. 2, and showing the partition raising and lowering mechanism.

Fig. 4 is a fragmentary elevational view of a hinge element as viewed from the line 4—4 of Fig. 3.

Fig. 5 is a fragmentary horizontal sectional view taken on the line 5—5 of Fig. 2.

Referring to accompanying drawings I have used the reference numeral 10 to indicate an automobile body of the closed car type having front and rear seats 11 and 12, respectively, which extend completely across the width of the interior of the body. The front seat 11 is in the driver's compartment 11' while the rear seat 12 is in the passenger's compartment 12'. The front seat 11 includes a seat back structure generally designated by the numeral 36 which comprises a forward seat back cushion 13 and a rear seat metal shield 36'. The seat back structure 36 also includes a transversely extending supporting bracket 21 which extends across the top of the structure 36 and is secured in place by a plate 22 which extends from the bracket 21 downwardly to the lower extremity of the structure 36. The plate 22 is disposed between the shield 36' and the cushion 13 and cooperates with the shield to form a chamber 22'. The bracket 21 cooperates with the upper extremity of the shield 36' which is formed in a U-shaped structure to provide a transversely extending slot 21' which extends across the top of the seat back structure 36. The seat back structure 36 is inclined rearwardly in a conventional manner and the top edge thereof is substantially in line with a pair of door pillars 14, one on each side of the car, which pillars extend from the roof to the sill of the body. The pillars 14 separate front doors 15 from rear doors 16 and are provided with grooves 17 which extend in an arcuate path from the top of the pillars to a point intermediate the top and bottom of the seat back structure 36. The grooves 17 are curved in arcs of circles of the same radii and about centers on a line extending transversely of the vehicle that are located forwardly of front seat 11. The grooves in the respective body pillars 14 are accordingly aligned so that the lateral edge portions of my improved vehicle partition 14, hereinafter more fully described, may be conveniently directly disposed and guided therein.

The grooves 17 are lined with suitable cushioning material 18 which contacts the lateral edge portions of the partition 19. The projected area of the partition 19 is substantially rectangular in shape and the partition is curved about a horizontal axis having the same curvature as the groove 17 to accommodate free movement of the partition therein. The partition 19 may comprise any type of transparent material, preferably glass, and is completely devoid of any frame structure or any other type of view obstructing structure and therefore allows unobstructed vision. By employing a frameless partition of this type, the strain generally applied to the edge portions of the partition in securing a frame thereto is eliminated. In accordance with my invention therefore the use of a frameless partition affords longer life to the partition due to the lack of stress applied to its edge portions. The afore mentioned horizontal axis of the partition 19 is located forwardly of the partition and therefore the convex surface of the partition faces toward the passenger compartment 12' of the vehicle. The partition 19, in its raised position shown in Fig. 1, has its lateral edge portions disposed in the grooves 17 and its upper edge portion engages a yieldable abutment member 20, preferably comprising rubber, which is disposed across the roof of the vehicle 10. The upper edge portion of the partition firmly contacts the abutment 20 when the partition is raised, forming a substantially air tight seal at the upper edge of the partition and also frictionally holding it against vibratory movement. When the partition 19 is in its lowered position as shown in Fig. 2, it is retracted within the chamber 22' of the seat back structure 36. When lowered the partition 19 withdraws from its raised position through the slot 21' until the partition is completely within the confines of the chamber 22'.

Although any conventional type of mechanism may be employed to raise and lower the partition 19 between its positions shown in Figs. 1 and 2, I have shown, for illustration, operating mechanism including an electric motor 23 secured to the front seat wall 22 and drivingly connected with gear mechanism 24 through a shaft 25. The gear mechanism 24 comprises a worm 26 secured to one end of the shaft 25 and meshed with a pair of worm gears 27 and 27' which, in turn, drive gears 28 and 28' through shafts 9 and 9', respectively, as shown in Fig. 3. The worm gear 27 and drive gear 28 are fixed on the same shaft 9 and the worm gear 27' and drive gear 28' are fixed on the same shaft 9'. The teeth of the gears 28 and 28' engage the teeth of gear sectors 29 and 29' which rotate arms 30 and 30' about the pivot points 31 and 31', respectively. The arms 30 and 30' are secured at pivot points 31 and 31' respectively, to a plate 32 which is secured and extends downwardly from the member 21, at an oblique angle so that the plate 32 will not interfere with the path of the partition 19. The outer ends of the arms 30 and 31' are provided with rollers 34 and 35 respectively, which are engaged in longitudinal slots 37 and 38, respectively, formed in a bracket 36 which is secured to the lower edge of the partition. Inasmuch as the arms 30 and 30' would normally swing in a flat plane, I have provided hinges 39 and 40 in the arms 30 and 30', respectively, so that the outer ends thereof may swing in planes disposed transversely to the plane of rotation of the inner end portions of the arms. Thus when the arms are rotated, the outer ends thereof are free to move forwardly or rearwardly to compensate for the arcuated path of travel of the partition 19.

Among the many advantages arising from the use of my improved structure, my partition being lowered in an arcuate path provides an increase in foot room for the occupants in the rear seat 47 which foot room would not otherwise be available if a straight vertically reciprocating partition were to be used.

While I have illustrated and described but one embodiment of my invention, it is to be understood that such is for the purpose of illustration only, and it is contemplated that those skilled in the art may modify certain details without departing from the spirit or scope of the invention as defined in the claim appended hereto.

I claim:

A motor vehicle including a body having a driver's compartment and a passenger compartment located rearwardly thereof, a seat structure in said driver's compartment having a storage chamber extending across the rear side of the seat back portion, aligned body center posts disposed on opposite sides of said seat structure and arranged in a plane extending through the back portion of said seat structure, said posts each having an arcuate groove extending lengthwise thereof, and a partition means located generally in the plane of said center posts and operable to cooperate with said seat structure to separate said compartments, said partition means including a frameless transparent plate curved about a horizontal axis arranged forwardly of the seat back portion such that said partition presents a convexly curved side that extends rearwardly towards the passenger compartment, said curved plate being of the same curvature as said post grooves and having the side edge portions thereof directly engaged in said post grooves which guide said plate during arcuate movement thereof about said aforementioned horizontal axis, said seat structure being adapted to enclose said plate in said storage chamber and having an elongated slot disposed in the upper edge communicating with said chamber and provided with a substantially uniform width exceeding the width of said plate by a relatively insignificant amount sufficient to accommodate said aforementioned arcuate movement of said plate, and means operable to selectively elevate said plate from a position within said chamber to a position above said seat structure and to lower said plate.

KAUFMAN T. KELLER.

REFERENCES CITED

The following references are of record in the file of this patent:

UNITED STATES PATENTS

| Number | Name | Date |
|---|---|---|
| 1,474,283 | Nystrom et al. | Nov. 13, 1923 |
| 1,921,263 | Rivard | Aug. 8, 1933 |
| 2,160,099 | Zeligman et al. | May 30, 1939 |